United States Patent
Pinarbasi

(12) 
(10) Patent No.: US 6,381,106 B1
(45) Date of Patent: Apr. 30, 2002

(54) TOP SPIN VALVE SENSOR THAT HAS A FREE LAYER STRUCTURE WITH A COBALT IRON BORON (COFEB) LAYER

(75) Inventor: Mustafa Pinarbasi, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/547,440

(22) Filed: Apr. 12, 2000

(51) Int. Cl.[7] .................................. G11B 5/39
(52) U.S. Cl. .................................. 360/324.12
(58) Field of Search ..................... 360/324.12

(56) References Cited

U.S. PATENT DOCUMENTS 5,909,345 A * 6/1999 Kawawake et al.
6,046,892 A * 4/2000 Aoshima et al.
6,111,722 A * 8/2000 Fukuzawa et al.
6,123,780 A * 9/2000 Kanai et al.
6,154,349 A * 11/2000 Kanai et al. ............ 360/324.12

* cited by examiner

Primary Examiner—Craig A. Renner
(74) Attorney, Agent, or Firm—Ervin F. Johnston

(57) ABSTRACT

A free layer structure is provided with a first layer of cobalt iron boron (CoFeB) for improving soft magnetic properties of the free layer structure in a top spin valve sensor by decreased uniaxial anisotropy $H_K$, easy axis coercivity $H_C$ and hard axis coercivity $H_{CK}$ of the free layer structure. The free layer structure also includes a second layer of nickel iron based material and a third layer of cobalt based material disposed adjacent a nonmagnetic conductive spacer layer of a spin valve sensor.

30 Claims, 7 Drawing Sheets

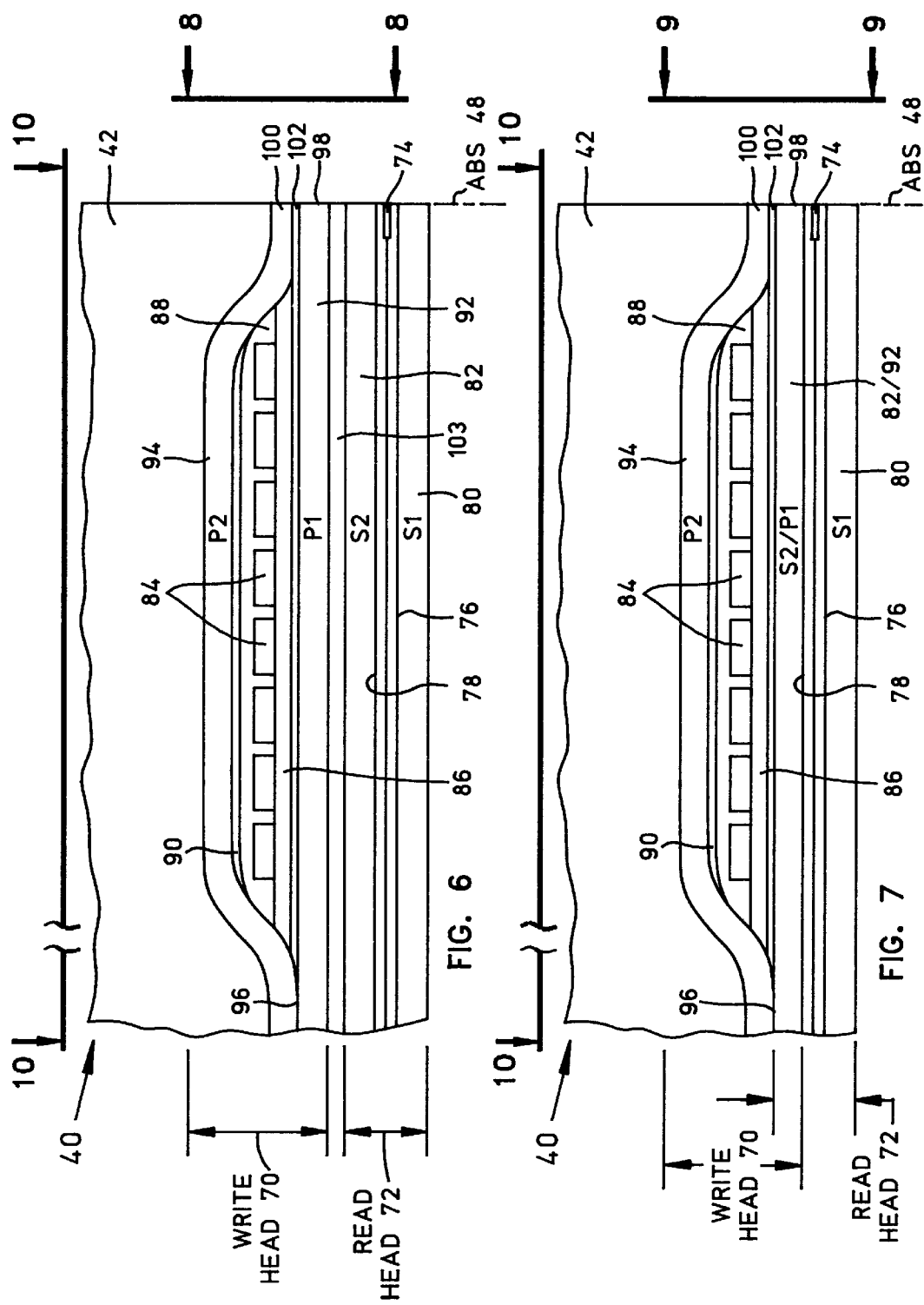

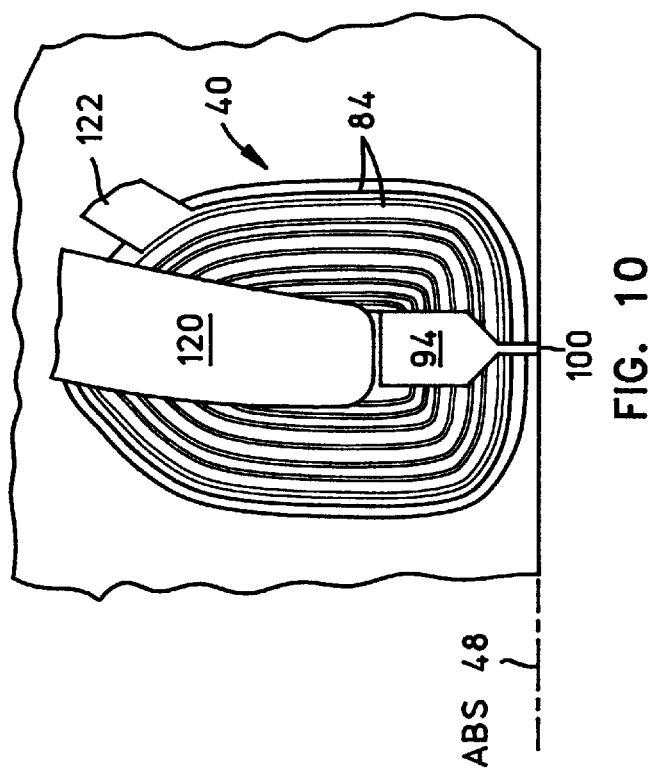
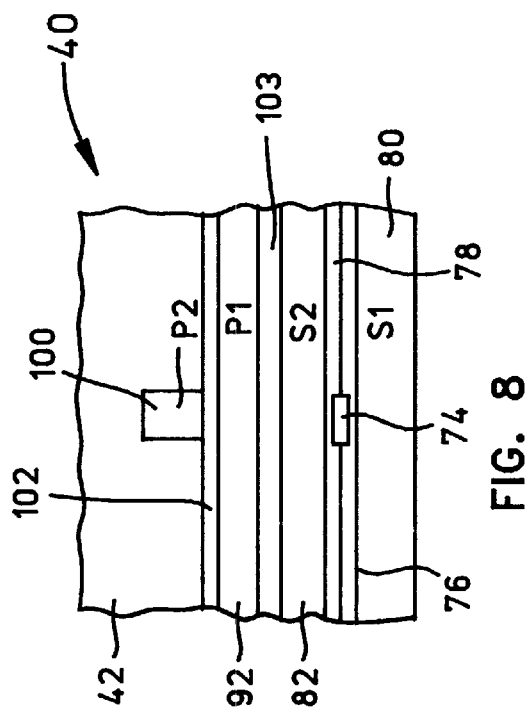
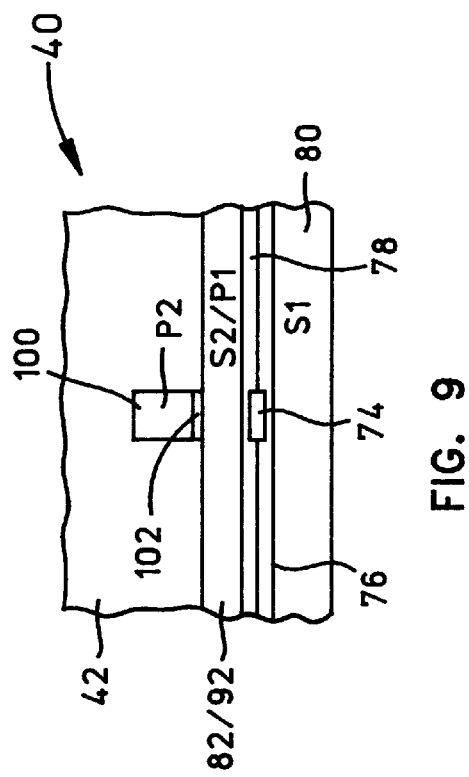

(ABS)

TOP SPIN VALVE SENSOR THAT HAS A FREE LAYER STRUCTURE WITH A COBALT IRON BORON (COFEB) LAYER

BACKGROUND OF THE INVENTION

1. Field of the Invention

The present invention relates to a top spin valve sensor that has a free layer structure with a cobalt iron boron (CoFeB) layer for promoting a softer free layer structure with improved easy axis and hard axis coercivities.

2. Description of the Related Art

A spin valve sensor is employed by a read head for sensing magnetic signal fields from a moving magnetic medium, such as a rotating magnetic disk. The sensor includes a nonmagnetic electrically conductive first spacer layer sandwiched between a ferromagnetic pinned layer and a ferromagnetic free layer. An antiferromagnetic pinning layer interfaces the pinned layer for pinning a magnetic moment of the pinned layer 90° to an air bearing surface (ABS) wherein the ABS is an exposed surface of the sensor that faces the magnetic disk. First and second leads are connected to the spin valve sensor for conducting a sense current therethrough. A magnetic moment of the free layer is free to rotate upwardly and downwardly with respect to the ABS from a quiescent or bias point position in response to positive and negative magnetic field signals from a rotating magnetic disk. The quiescent position, which is preferably parallel to the ABS, is the position of the magnetic moment of the free layer with the sense current conducted through the sensor in the absence of signal fields.

The thickness of the spacer layer is chosen so that shunting of the sense current and a magnetic coupling between the free and pinned layers are minimized. This thickness is typically less than the mean free path of electrons conducted through the sensor. With this arrangement, a portion of the conduction electrons are scattered at the interfaces of the spacer layer with the pinned and free layers. When the magnetic moments of the pinned and free layers are parallel with respect to one another scattering is minimal and when their magnetic moments are antiparallel scattering is maximized. Changes in scattering changes the resistance of the spin valve sensor as a function of cos θ, where θ is the angle between the magnetic moments of the pinned and free layers. The sensitivity of the sensor is quantified as magnetoresistive coefficient dr/R where dr is the change in the resistance of the sensor as the magnetic moment of the free layer rotates from a position parallel with respect to the magnetic moment of the pinned layer to an antiparallel position with respect thereto and R is the resistance of the sensor when the magnetic moments are parallel.

A read head in a magnetic disk drive of a computer includes the spin valve sensor as well as nonconductive nonmagnetic first and second read gap layers and ferromagnetic first and second shield layers. The spin valve sensor is located between the first and second read gap layers and the first and second read gap layers are located between the first and second shield layers. In the construction of the read head the first shield layer is first formed followed by formation of the first read gap layer, the spin valve sensor, the second read gap layer and the second shield layer. Spin valve sensors are classified as a top or a bottom spin valve sensor depending upon whether the pinning layer is located at the bottom o the sensor next to the first read gap layer or at the top of the sensor closer to the second read gap layer. Spin valve sensors are further classified as simple pinned or antiparallel pinned depending upon whether the pinned layer structure is one or more ferromagnetic layers with a unidirectional magnetic moment or a pair of ferromagnetic leers that are separated by a coupling layer with magnetic moments of the ferromagnetic layers being antiparallel.

A free layer structure typically employs a nickel iron (NiFe) free layer and a cobalt iron (CoFe) layer which is sometimes referred to as a nanolayer. Typical thicknesses are 45 Å for the free layer and 10 Å to 15 Å for the nanolayer. While the nickel iron (NiFe) free layer has soft magnetic properties, the cobalt iron (CoFe) of the nanolayer unfortunately increases the uniaxial anisotropy $H_K$ and the easy axis coercivity $H_C$ of the free layer structure making the magnetic moment of the free layer structure stiffer and less responsive to signal fields from the rotating magnetic disk. The result is less sensitivity of the read head. The uniaxial anisotropy $H_K$ is the amount of applied field required to rotate the magnetic moment of the free layer structure in a direction 90° from its easy is and the easy axis coercivity $H_C$ is the amount of applied field required to rotate the magnetic moment of the free layer structure from one direction along its easy axis to an opposite direction.

The cobalt iron (CoFe) nanolayer also causes the free layer structure to have a higher hard axis coercivity $H_{CK}$ where the hard axis coercivity is the amount of field required to return the magnetic moment of the free layer structure from a remanent magnetization to zero. Hard axis coercivity $H_{CK}$ can be seen on a hard axis B/H loop of the free layer structure by the amount of openness of the hard axis loop along the abscissa wherein the abscissa represents the applied field. When the free layer structure has hard axis coercivity noise is generated in the read head due to jumps in the movements of the magnetic moment of the free layer structure in contrast to a smooth transition when subjected to signs fields from the rotating disk. Accordingly, it is desirable to improve the softness of the free layer structure so as to reduce uniaxial anisotropy $H_K$, easy axis coercivity $H_C$ and hard axis coercivity $H_{CK}$.

SUMMARY OF THE INVENTION

I have provided the free layer structure with a layer of cobalt iron boron (CoFeB) which improves the performance of the free layer structure. Tests conducted by me show that the uniaxial anisotropy $H_K$, the easy axis coercivity $H_C$ and the hard axis coercivity $H_{CK}$ of the free layer structure were improved. The preferred pinning layer is platinum manganese (PtMn). The invention can be employed for a top spin valve sensor with a single or AP pinned layer structure.

An object of the present invention is to provide a seed layer for a top spin valve sensor that improves the soft magnetic properties of a free layer structure.

Another object is to provide a seed layer for a top spin valve sensor which improves the uniaxial anisotropy $H_K$, easy axis coercivity $H_C$ and hard axis coercivity $H_{CK}$ of a free layer structure.

A further object is to provide a seed layer for a top spin valve sensor which improves the texture of layers constructed on the seed layer for improving performance of the spin valve sensor.

Other objects and attendant advantages of the invention will be appreciated upon reading the following description taken together with the accompanying drawings.

BRIEF DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

FIG. 8 is a partial ABS view of the slider taken along plane 8—8 of FIG. 6 to show the read and write elements of the piggyback magnetic head;

FIG. 9 is a partial ABS view of the slider taken along plane 9—9 of FIG. 7 to show the read and write elements of the merged magnetic head;

FIG. 10 is a view taken along plane 10—10 of FIGS. 6 or 7 with all material above the coil layer and leads removed;

DESCRIPTION OF THE PREFERRED EMBODIMENTS

Magnetic Disk Drive

Figure 1:
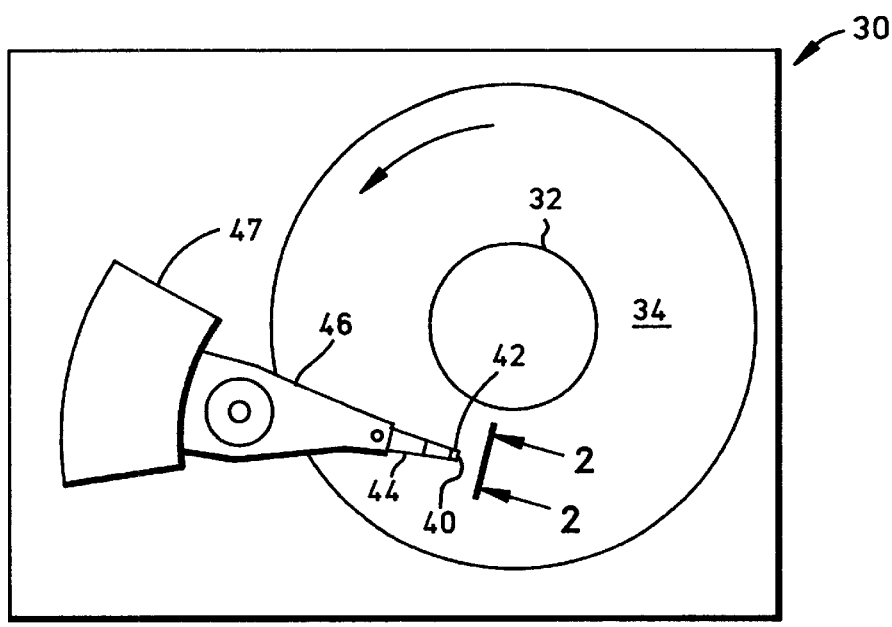
FIG. 1 is a planar view of an exemplary magnetic disk drive.
Figure 2:
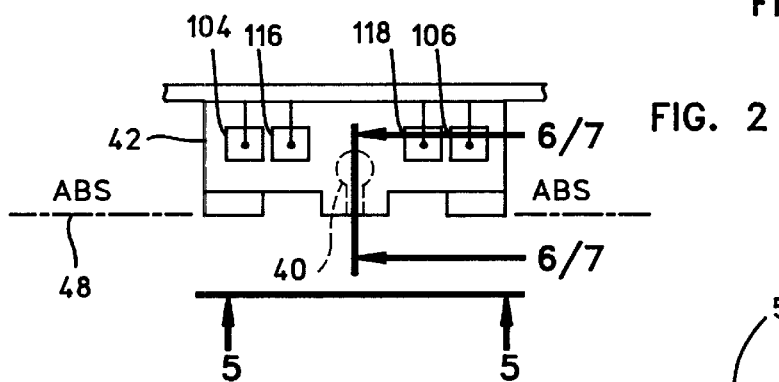
FIG. 2 is an end view of a slider with a magnetic head of the disk drive as seen in plane 2—2.
Figure 3:
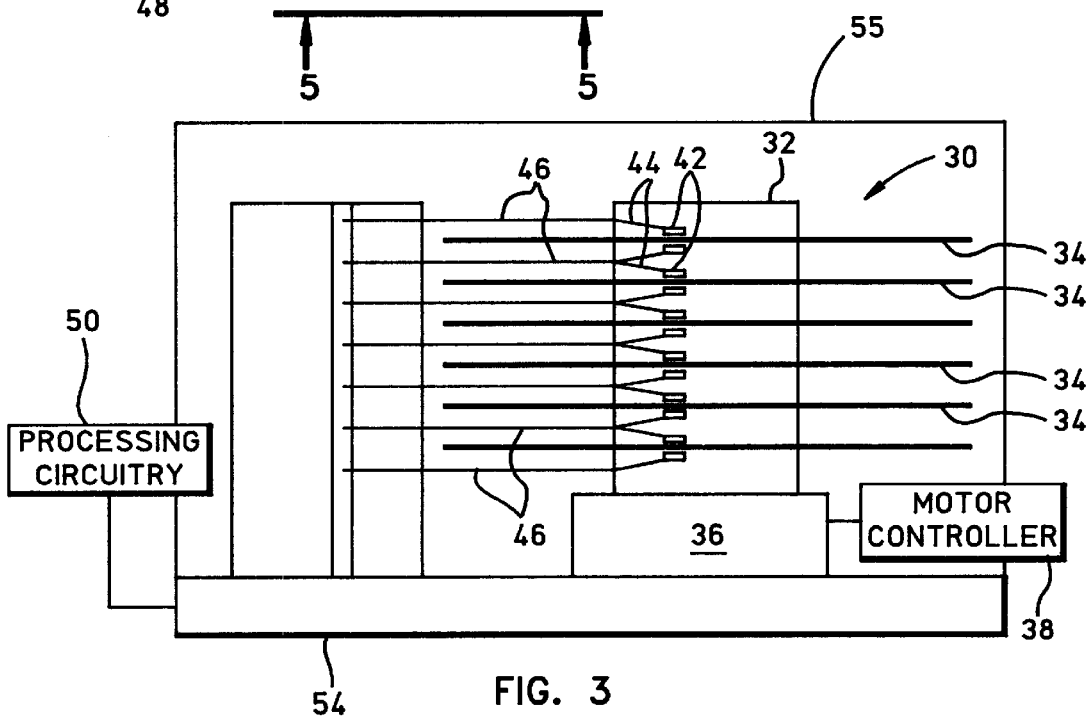
FIG. 3 is an elevation view of the magnetic disk drive wherein multiple disks and magnetic heads are employed.
Figure 4:
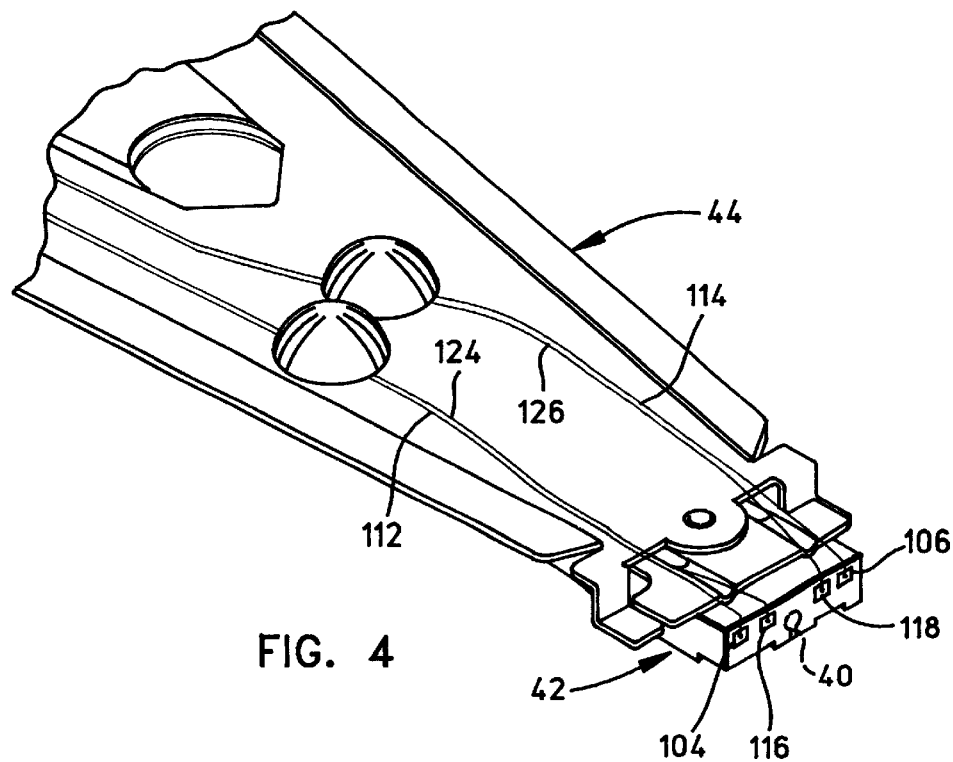
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 supports a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
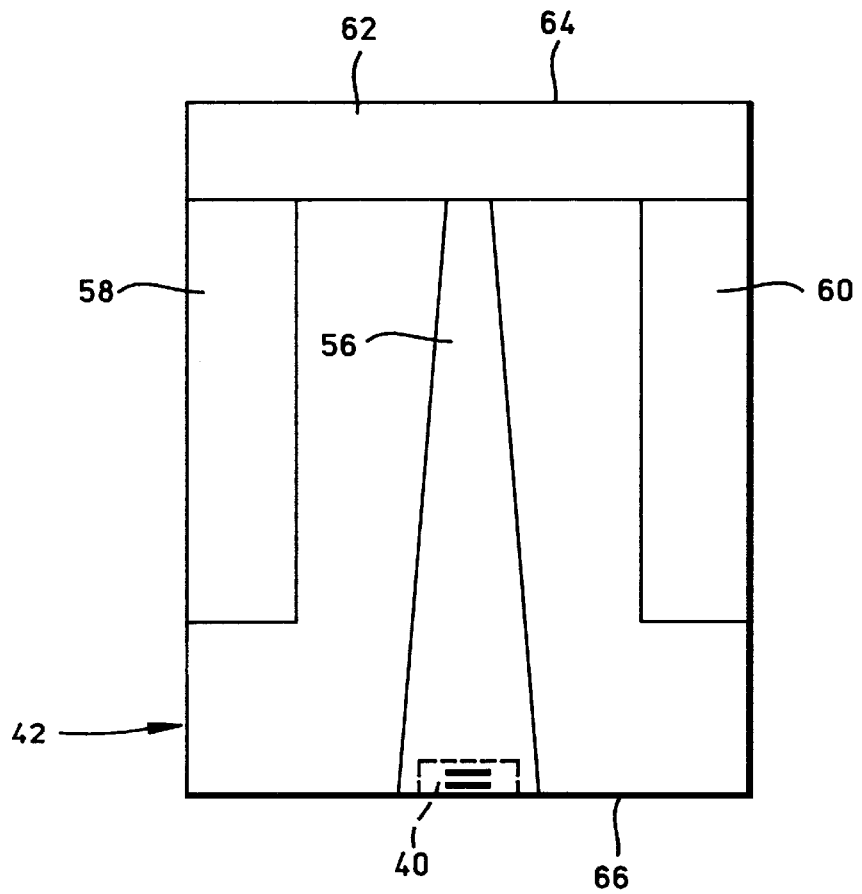
FIG. 5 is an ABS view of the slider taken along plane 5—5 of FIG. 2.

FIG. 5 is an ABS view of the slider 42 and the magnetic head 40. The slider has a center rail 56, which supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
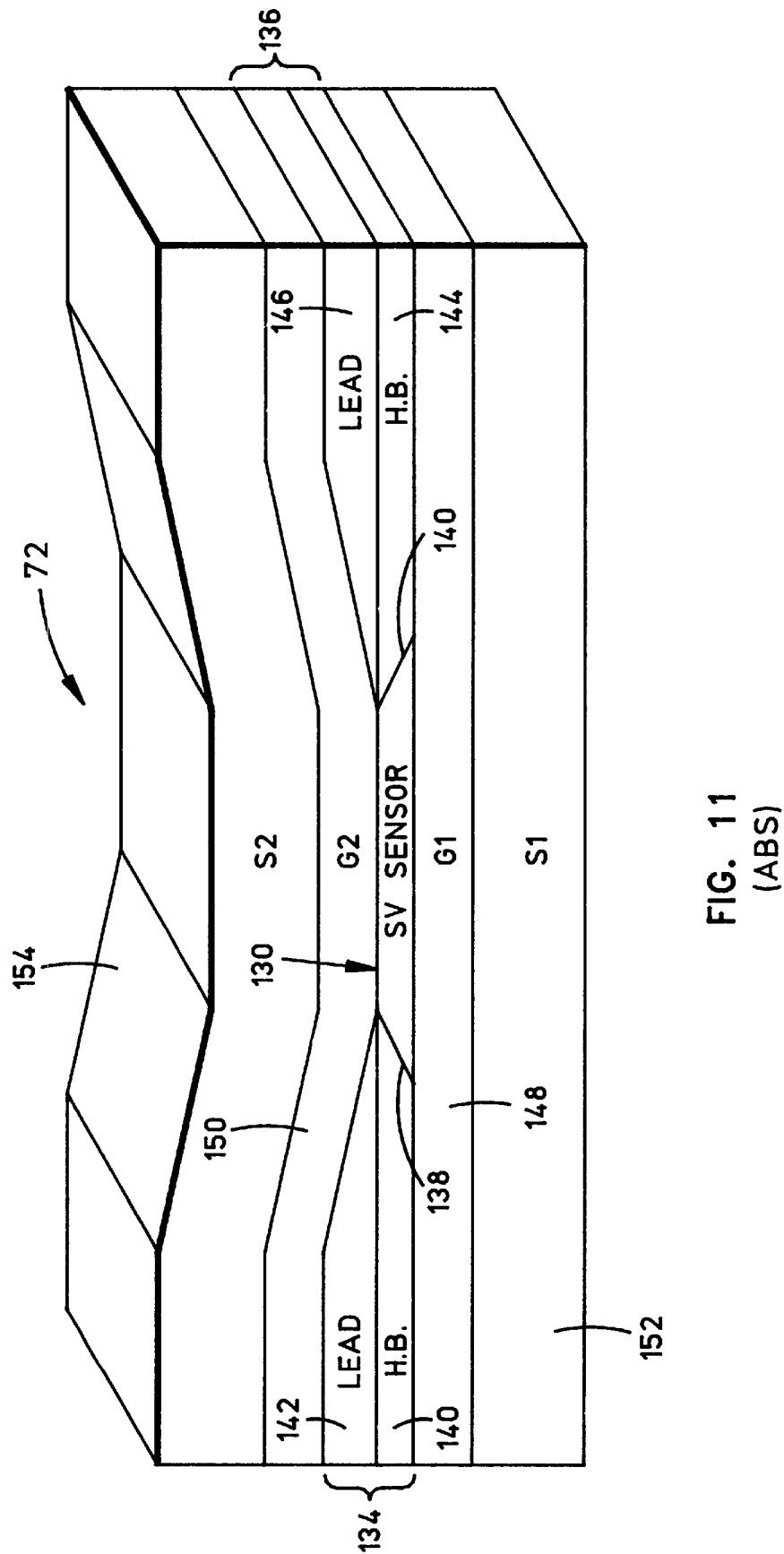
FIG. 11 is an isometric ABS illustration of an exemplary read head which employs a top spin valve sensor longitudinally biased by hard biasing layers.

FIG. 11 is an isometric ABS illustration of a read head 72 which has a top spin valve sensor 130. First and second hard bias and lead layers 134 and 136 are connected to first and second side edges 138 and 140 of the spin valve sensor. This connection is known in the art as a contiguous junction and is fully described in commonly assigned U.S. Pat. No. 5, 018, 037. The first hard bias and lead layers include a first hard bias layer 140 and a first lead layer 142 and the second hard bias and lead layers 136 include a second hard bias layer 144 and a second lead layer 146. The hard bias layers 140 and 144 cause magnetic flux to extend longitudinally through the spin valve sensor 130 for stabilizing magnetic domains of the free layer. The spin valve sensor 130 and the first and second hard bias and lead layers 134 and 136 are located between nonmagnetic electrically insulative first and second read gap layers 148 and 150. The first and second read gap layers 148 and 150 are, in turn, located between first and second shield layers 152 and 154.

EXAMPLE 1

Comparative Example

Figure 12:
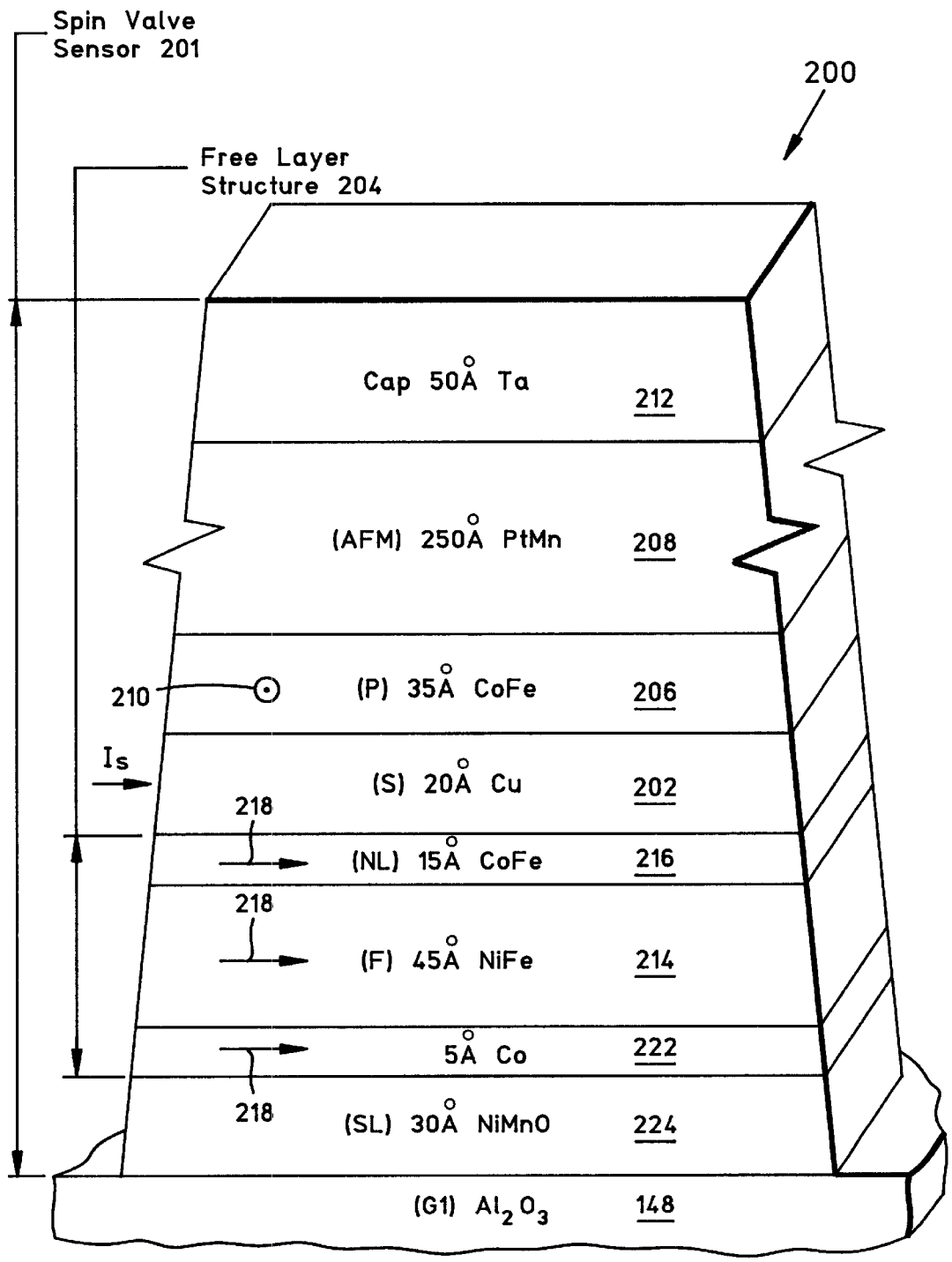
FIG. 12 is an ABS illustration of a comparative example of a top spin valve sensor.

FIG. 12 shows a read head 200 with a spin valve sensor 201 which may be constructed on the first read gap layer (G1) 148 shown in FIG. 11. The spin valve sensor 201 includes a nonmagnetic conductive spacer layer (S) 202 which is located between a free layer structure 204 and a pinned layer (P) 206. The pinned layer 206 is exchange coupled to an antiferromagnetic (AFM) pinning layer 208. The pinning layer 208 pins a magnetic moment 210 of the pinning layer perpendicular to the ABS in a direction away from the sensor, as shown in FIG. 12, or optionally into the sensor. A cap layer 212 on the pinning layer 208 protects the pinning layer from subsequent processing steps.

The free layer structure 204 includes a free layer (F) 214 and a nanolayer (NL) 216. It has been found that a cobalt iron (CoFe) nanolayer 216 between the free layer 214 and the spacer layer 202 significantly increases the magnetoresistive coefficient dr/R of the spin valve sensor. While the nickel iron (NiFe) of the free layer 214 has desirable soft magnetic properties, the cobalt iron (CoFe) of the nanolayer, unfortunately, decreases the soft magnetic properties of the free layer structure 204 and makes it stiffer in its response to signal fields from a rotating magnetic disk. Accordingly, the magnetic moment 218 of the free layer structure is stiffer in its response to positive and negative signal fields from the rotating magnetic disk. If the magnetic moment 219 is stiff in its operation, due to a lack of softness of the free layer structure, it will not rotate as far when being subjected to the positive and negative signal fields from the rotating magnetic disk. This results in less signal and a decrease in sensitivity of the read head.

The softness of the free layer structure 204 is quantified by. (1) uniaxial anisotropy $H_K$, which is the amount of field required to rotate the magnetic moment 218 from its easy axis perpendicular to the ABS, (2) easy axis coercivity $H_C$, which is the amount of field required to rotate the magnetic moment 218 antiparallel to the direction shown in FIG. 12 and (3) hard axis coercivity $H_{CK}$, which is the amount of applied field required to return the magnetic moment 218 to the position shown in FIG. 12 from remanent magnetization as seen on a hard axis B/H loop for the spin valve sensor. When these values are low the free layer structure has soft magnetic properties. Since the free layer structure 204 is closer to the first read gap layer 148 than the second read gap layer (see 150 in FIG. 11) the spin valve sensor 201 is referred to in the art as a top spin valve sensor.

A positive signal field from the rotating magnetic disk will rotate the magnetic moment 218 into the head which will make the magnetic moments 218 and 210 to be more antiparallel. This increases the resistance of the spin valve sensor. Upon the occurrence of a negative signal field from the rotating magnetic disk the magnetic moment 218 rotates downwardly which makes the magnetic moments 218 and 210 more parallel. This decreases the resistance of the spin valve sensor. Upon conduction of the sense current $I_S$ through the spin valve sensor these increases and decreases in the resistance of the spin valve sensor are processed as playback signals by the processing circuitry 50 shown in FIG. 3.

In order to improve the performance of the free layer structure 204, the free layer structure is provided with a layer 222 which is composed of cobalt (Co) and a seed layer (SL) 224 composed of nickel manganese oxide (NiMnO) is provided as a seed layer for the cobalt (Co) layer 222. The seed layer 224 is located between and interfaces the first read gap layer 148 and the cobalt layer (Co) 222.

The thicknesses and materials of the layers are 30 Å of nickel manganese oxide ($Ni_{50}Mn_{50}O$) for the second seed layer 224, 5 Å of cobalt (Co) for the layer 222, 45 Å of nickel iron ($Ni_{82}Fe_{18}$) for the free layer 214, 15 Å of cobalt iron ($Co_{90}Fe_{10}$) for the nanolayer 216, 20 Å of copper (Cu) for the spacer layer 202, 35 Å of cobalt iron ($Co_{90}Fe_{10}$) for the pinned layer 206, 250 Å of platinum manganese ($Pt_{50}Mn_{50}$) for the pinning layer 208 and 50 Å of tantalum (Ta) for the cap layer 212.

The embodiment shown in FIG. 12 was tested and it was found that in regard to the free layer structure 204 the uniaxial anisotropy $H_K$ was 29.7 Oe, the easy axis coercivity $H_C$ was 6.1 Oe and the hard axis coercivity $H_{CK}$ was 5.21 Oe.

EXAMPLE 2

Embodiment of the Present Invention

Figure 13:
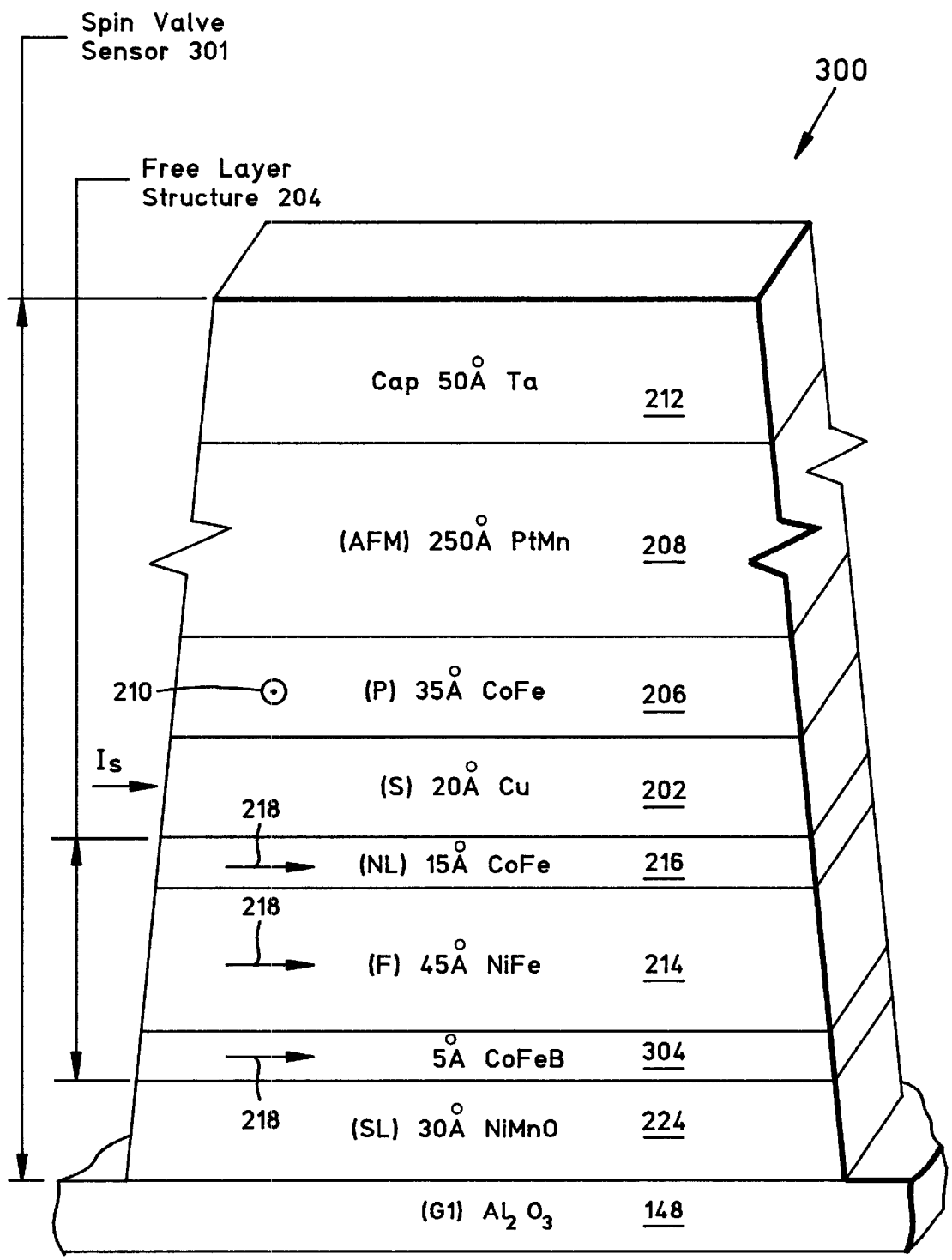
FIG. 13 is an ABS illustration of the present spin top valve sensor.

The read head 300 in FIG. 13 is the same as the embodiment 200 shown in FIG. 12 except the free layer structure 204 of spin valve sensor 301 includes a layer 304 that is 5 Å of cobalt iron boron ($Co_{88}Fe_9B_3$) in place of the layer 222 in FIG. 12. Upon testing this embodiment it was found that in regard to the free layer structure 204 the uniaxial anisotropy $H_K$ was 21 Oe, the easy axis coercivity $H_C$ was 5.02 Oe and the hard axis coercivity $H_{CK}$ was 3.02 Oe. In comparing these values with those of the embodiment shown in FIG. 12 the uniaxial anisotropy $H_K$ was improved from 29.7 Oe to 21 Oe, the easy axis coercivity $H_C$ was improved from 6.1 Oe to 5.02 Oe and the hard axis coercivity $H_{CK}$ was improved from 5.21 Oe to 3.02 Oe. Accordingly, the cobalt iron boron (CoFeB) layer 304 significantly increased the soft magnetic properties of the free layer structure 204 which makes the free layer structure more responsive to signal fields from the rotating magnetic disk. Further, by reducing the hard axis coercivity $H_{CK}$, jumps of the magnetic moment of the free layer structure in response to the signal fields were minimized thereby reducing noise generated by the read head.

Discussion

While the preferred percentage composition of the various elements of the materials are $Co_{88}Fe_9B_3$, $Ni_{50}Mn_{50}O$, $Pt_{50}Mn_{50}$, $Co_{90}Fe_{10}$ and $Ni_{82}Fe_{18}$ understood that the percentage of each element with a percentage can be any value provided the total percentage for each alloy equals 100%. All of the layers of the embodiments shown in FIGS. 12 and 13 were deposited in situ except for the first gap layer 148 wherein in situ means that all of the layers are deposited in a ion beam sputtering chamber without breaking the vacuum.

It should be understood that an antiparallel (AP) pinned layer structure can be substituted for the pinned layer 206 in FIG. 13. The AP pinned layer structure is described in commonly assigned U.S. Pat. No. 5, 465, 185 to Heim and Parkin which is incorporated by reference herein.

It should further be understood that the thicknesses for the various layers are exemplary and can be varied. Further, while cobalt iron (CoFe) is preferred for the pinned and nanolayers, cobalt (Co) could be substituted therefor. Still further, while platinum manganese (PtMn) is preferred for the pinning layers, other metallic antiferromagnetic materials may be employed such as iridium manganese (IrMn), iron manganese (FeMn), palladium platinum manganese (PdPtMn) and nickel manganese (NiMn).

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:
1. A magnetic read head comprising:
   a spin valve sensor including:
   a ferromagnetic pinned layer structure that has a magnetic moment;
   an antiferromagnetic pinning layer exchange coupled to the pinned layer structure for pinning the magnetic moment of the pinned layer structure;
   a ferromagnetic free layer structure that includes first, second and third free layers with the second free layer located between and interfacing each of the first and third free layers;
   the first free layer being composed of cobalt iron boron (CoFeB), the second free layer being composed of a nickel iron based material and the third free layer being composed of a cobalt based material; and
   a nonmagnetic conductive spacer layer located between the free layer structure and the pinned layer structure and interfacing the third free layer.

2. A magnetic read head as claimed in claim 1 including:
   nonmagnetic nonconductive first and second read gap layers;
   the spin valve sensor being located between the first and second read gap layers;
   ferromagnetic first and second shield layers;
   the first and second read gap layers being located between the first and second shield layers; and
   the first free layer being located between the first read gap layer and the second free layer.

3. A magnetic read head as claimed in claim 2 wherein the second free layer is composed of nickel iron (NiFe) and the third free layer is composed of cobalt iron (CoFe).

4. A magnetic read head as claimed in claim 2 including:
   a seed layer composed of nickel manganese oxide (NiMnO) which is located between and interfaces each of the first read gap layer and the first free layer.

5. A magnetic read head as claimed in claim 4 wherein the second free layer is composed of nickel iron (NiFe) and the third free layer is composed of cobalt iron (CoFe).

6. A magnetic read head as claimed in claim 5 wherein the pinning layer is platinum manganese (PtMn).

7. A magnetic head assembly, including a write head and a read head, comprising:
   the write head including:
      ferromagnetic first and second pole piece layers that each have a yoke portion located between a pole tip portion and a back gap portion;
      a nonmagnetic write gap layer located between the pole tip portions of the first and second pole piece layers;
      an insulation stack with at least one coil layer embedded therein located between the yoke portions of the first and second pole piece layers; and
      the first and second pole piece layers being connected at their back gap portions;
   the read head including;
      a spin valve sensor;
      nonmagnetic nonconductive first and second read gap layers;
      the spin valve sensor being located between the first and second read gap layers;
      a ferromagnetic first shield layer; and
      the first and second read gap layers being located between the first shield layer and the first pole piece layer;
   the spin valve sensor including:
      a ferromagnetic pinned layer structure that has a magnetic moment;
      an antiferromagnetic pinning layer exchange coupled to the pinned layer structure for pinning the magnetic moment of the pinned layer structure;
      a ferromagnetic free layer structure that includes first, second and third free layers with the second free layer located between and interfacing each of the first and third free layers;
      the first free layer being composed of cobalt iron boron (CoFeB), the second free layer being composed of a nickel iron based material and the third free layer being composed of a cobalt based material;
      the first free layer being located between the first read gap layer and the second free layer; and
      a nonmagnetic conductive spacer layer located between the free layer structure and the pinned layer structure and interfacing the third free layer.

8. A magnetic head assembly as claimed in claim 7 including:
   a ferromagnetic second shield layer;
   a nonmagnetic isolation layer; and
   the second shield layer being located between the second read gap layer and the isolation layer and the nonmagnetic isolation layer being located between the second shield layer and the first pole piece layer.

9. A magnetic head assembly as claimed in claim 7 wherein the second free layer is composed of nickel iron (NiFe) and the third free layer is composed of cobalt iron (CoFe).

10. A magnetic head assembly as claimed in claim 7 including:
    a seed layer composed of nickel manganese oxide (NiMnO) which is located between and interfaces each of the first read gap layer and the first free layer.

11. A magnetic head assembly as claimed in claim 10 wherein the second free layer is composed of nickel iron (NiFe) and the third free layer is composed of cobalt iron (CoFe).

12. A magnetic head assembly as claimed in claim 11 wherein the pinning layer is platinum manganese (PtMn).

13. A magnetic disk drive including at least one magnetic head assembly that includes a write head and a read head, comprising:
    the write head including:
       ferromagnetic first and second pole piece layers that each have a yoke portion located between a pole tip portion and a back gap portion;
       a nonmagnetic write gap layer located between the pole tip portions of the first and second pole piece layers;
       an insulation stack with at least one coil layer embedded therein located between the yoke portions of the first and second pole piece layers; and
       the first and second pole piece layers being connected at their back gap portions;
    the read head including:
       a spin valve sensor;
       nonmagnetic nonconductive first and second read gap layers;
       the spin valve sensor being located between the first and second read gap layers;
       a ferromagnetic first shield layer; and
       the first and second read gap layers being located between the first shield layer and the first pole piece layer;

the spin valve sensor including:
   a ferromagnetic pinned layer structure that has a magnetic moment;
   an antiferromagnetic pinning layer exchange coupled to the pinned layer structure for pinning the magnetic moment of the pinned layer structure;
   a ferromagnetic free layer structure that includes first, second and third free layers with the second free layer located between and interfacing each of the first and third free layers;
   the first free layer being composed of cobalt iron boron (CoFeB), the second free layer being composed of a nickel iron based material and the third free layer being composed of a cobalt based material;
   the first free layer being located between the first read gap layer and the second free layer; and a nonmagnetic conductive spacer layer located between the free layer structure and the pinned layer structure and interfacing the third free layer;
a housing;
a magnetic disk rotatably supported in the housing;
a support mounted in the housing for supporting the magnetic head assembly with its air bearing surface (ABS) facing the magnetic disk so that the magnetic head assembly is in a transducing relationship with the magnetic disk;
a spindle motor for rotating the magnetic disk;
an actuator positioning means connected to the support for moving the magnetic head assembly to multiple positions with respect to said magnetic disk; and
a processor connected to the magnetic head assembly, to the spindle motor and to the actuator positioning means for exchanging signals with the magnetic head assembly, for controlling movement of the magnetic disk and for controlling the position of the magnetic head assembly.

14. A magnetic disk drive as claimed in claim 13 including:
   a ferromagnetic second shield layer;
   a nonmagnetic isolation layer; and
   the second shield layer being located between the second read gap layer and the isolation layer and the nonmagnetic isolation layer being located between the second shield layer and the first pole piece layer.

15. A magnetic disk drive as claimed in claim 13 wherein the second free layer is composed of nickel iron (NiFe) and the third free layer is composed of cobalt iron (CoFe).

16. A magnetic disk drive as claimed in claim 13 including:
   a seed layer composed of nickel manganese oxide (NiMnO) which is located between and interfaces each of the first read gap layer and the first free layer.

17. A magnetic disk drive as claimed in claim 16 wherein the second free layer is composed of nickel iron (NiFe) and the third free layer is composed of cobalt iron (CoFe).

18. A magnetic disk drive as claimed in claim 17 wherein the pinning layer is platinum manganese (PtMn).

19. A method of making a magnetic read head that includes a spin valve sensor comprising the steps of:
   making the spin valve sensor as follows:
      forming a ferromagnetic pinned layer structure that has a magnetic moment;
      forming an antiferromagnetic pinning layer exchange coupled to the pinned layer structure for pinning the magnetic moment of the pinned layer structure;
      forming a ferromagnetic free layer structure that includes first, second and third free layers with the second free layer located between and interfacing each of the first and third free layers;
      forming the first free layer of cobalt iron boron (CoFeB), the second free layer of a nickel iron based material and the third free layer of a cobalt based material; and
      forming a nonmagnetic conductive spacer layer between the free layer structure and the pinned layer structure and interfacing the third free layer.

20. A method as claimed in claim 19 including:
   forming nonmagnetic nonconductive first and second read gap layers;
   forming the spin valve sensor between the first and second read gap layers;
   forming ferromagnetic first and second shield layers;
   forming the first and second read gap layers between the first and second shield layers; and
   forming the first free layer between the first read gap layer and the second free layer.

21. A method as claimed in claim 20 wherein the second free layer is formed of nickel iron (NiFe) and the third free layer is formed of cobalt iron (CoFe).

22. A method as claimed in claim 20 including:
   forming a seed layer composed of nickel manganese oxide (NiMnO) between and interfacing each of the first read gap layer and the first free layer.

23. A method as claimed in claim 22 wherein the second free layer is formed of nickel iron (NiFe) and the third free layer is formed of cobalt iron (CoFe).

24. A method as claimed in claim 23 wherein the pinning layer is formed of platinum manganese (PtMn).

25. A method of making a magnetic head assembly that includes a write head and a read head, comprising the steps of:
   a making of the write head including:
      forming ferromagnetic first and second pole piece layers in pole tip, yoke and back gap regions wherein the yoke region is located between the pole tip and back gap regions;
      forming a nonmagnetic nonconductive write gap layer between the first and second pole piece layers in the pole tip region;
      forming an insulation stack with at least one coil layer embedded therein between the first and second pole piece layers in the yoke region; and
      connecting the first and second pole piece layers at said back gap region;
   making the read head as follows:
      forming a spin valve sensor;
      forming nonmagnetic nonconductive first and second read gap layers with the spin valve sensor located between the first and second read gap layers;
      forming a ferromagnetic first shield layer with the first and second read gap layers located between the first shield layer and the first pole piece layer;
   making the spin valve sensor as follows:
      forming a ferromagnetic pinned layer structure that has a magnetic moment;
      forming an antiferromagnetic pinning layer exchange coupled to the pinned layer structure for pinning the magnetic moment of the pinned layer structure;

forming a ferromagnetic free layer structure that includes first, second and third free layers with the second free layer located between and interfacing each of the first and third free layers;

forming the first free layer of cobalt iron boron (CoFeB), the second free layer of a nickel iron based material and the third free layer of a cobalt based material;

forming the first free layer between the first read gap layer and the second free layer; and forming a nonmagnetic conductive spacer layer between the free layer structure and the pinned layer structure.

26. A method as claimed in claim 25 including the steps of:

forming a ferromagnetic second shield layer;

forming a nonmagnetic isolation layer with the second shield layer between the second read gap layer and the isolation layer and the nonmagnetic isolation layer between the second shield layer and the first pole piece layer.

27. A method as claimed in claim 25 wherein the second free layer is formed of nickel iron (NiFe) and the third free layer is formed of cobalt iron (CoFe).

28. A method as claimed in claim 25 including:

forming a seed layer composed of nickel manganese oxide (NiMnO) between and interfacing each of the first read gap layer and the first free layer.

29. A method as claimed in claim 28 wherein the second free layer is formed of nickel iron (NiFe) and the third free layer is formed of cobalt iron (CoFe).

30. A method as claimed in claim 29 wherein the pinning layer is formed of platinum manganese (PtMn).

* * * * *